(12) United States Patent
Yudasaka et al.

(10) Patent No.: US 6,331,690 B1
(45) Date of Patent: Dec. 18, 2001

(54) PROCESS FOR PRODUCING SINGLE-WALL CARBON NANOTUBES UNIFORM IN DIAMETER AND LASER ABLATION APPARATUS USED THEREIN

(75) Inventors: Masako Yudasaka; Sumio Iijima, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/562,959

(22) Filed: May 3, 2000

Related U.S. Application Data

(62) Division of application No. 09/177,790, filed on Oct. 23, 1998.

(30) Foreign Application Priority Data

Dec. 22, 1997 (JP) ................................................... 9-352833

(51) Int. Cl.[7] ........................... B23K 26/00; B23K 26/12; B23K 26/16
(52) U.S. Cl. ................... 219/121.6; 219/121.76; 219/121.86; 204/157.41; 204/157.47; 423/445 B; 423/447.3
(58) Field of Search ........................ 204/157.41, 157.47; 423/445 B, 447.2, 447.3; 219/121.86, 121.76, 121.77, 121.6

(56) References Cited

U.S. PATENT DOCUMENTS

| | | | |
|---|---|---|---|
| 5,126,200 | * | 6/1992 | Nordine . |
| 5,300,203 | * | 4/1994 | Smalley ............................ 423/445 B |
| 5,406,906 | * | 4/1995 | Rimai .................................... 117/904 |
| 5,424,054 | * | 6/1995 | Bethune et al. . |
| 5,547,748 | * | 8/1996 | Ruoff et al. . |
| 5,591,312 | * | 1/1997 | Smalley . |
| 5,993,697 | * | 11/1999 | Cohen et al. . |
| 6,045,769 | * | 4/2000 | Kambe et al. . |
| 6,139,919 | * | 10/2000 | Eklund et al. . |
| 6,156,256 | * | 12/2000 | Kennel . |
| 6,183,714 | * | 2/2001 | Smalley et al. . |
| 6,203,864 | * | 3/2001 | Zhang et al. . |
| 6,221,330 | * | 4/2001 | Moy et al. . |

FOREIGN PATENT DOCUMENTS

| | | | |
|---|---|---|---|
| 1273215-A | * | 11/2000 | (CN) . |
| 499805 | * | 8/1992 | (EP) . |
| 411180707-A | * | 7/1999 | (JP) . |
| 97-09272 | * | 3/1997 | (WO) . |

OTHER PUBLICATIONS

US 2001/0001681 A1 Zhang et al. (May 24, 2001).*
US 2001/0001654 A1 Yudasaka et al. (May 24, 2001).*
Yudasaka, M., et al. "Single–wall Carbon Nanotube Formation . . . Using Double–Targets . . . " Chem. Phys. Lett; vol. 278, pp 102–106, Oct. 24, 1997.*
A. Thess et al, "Crystalline Ropes of Metallic Carbon Nanotubes", Science, vol. 273, Jul. 26, 1996, pp. 483–487.

* cited by examiner

Primary Examiner—M. Alexandra Elve
Assistant Examiner—Kiley Stoner
(74) Attorney, Agent, or Firm—Sughrue, Mion, Zinn, Macpeak & Seas, PLLC

(57) ABSTRACT

Single-wall carbon nanotubes are produced from carbon vapor in the presence of nickel-cobalt catalyst vapor, and the carbon vapor and the nickel-cobalt catalyst vapor are constantly generated from a carbon pellet and a nickel-cobalt pellet under radiation of YAG laser beams so that the single-wall carbon nanotubes are constant in diameter.

7 Claims, 4 Drawing Sheets

PROCESS FOR PRODUCING SINGLE-WALL CARBON NANOTUBES UNIFORM IN DIAMETER AND LASER ABLATION APPARATUS USED THEREIN

This is a divisional of application Ser. No. 09/177,790 filed Oct. 23, 1998, the disclosure of which is incorporated herein by reference.

Priority is claimed from Dec. 22, 1997 based on JP Application No. 9-352833. The priority document was filed in parent Application No. 09/177,790.

FIELD OF THE INVENTION

This invention relates to a carbon nanotube and, more particularly, to a process for producing a carbon nanotube and a laser ablation apparatus used therein.

DESCRIPTION OF THE RELATED ART

A typical example of the process for producing carbon nanotubes is disclosed by Andreas Thess et al in "Crystalline Ropes of Metallic Carbon Nanotubes", Science, vol. 273, pages 483 to 487, Jul. 26, 1996. Metal catalyst particle such as nickel-cobalt alloy is mixed with graphite powder at a predetermined percentage, and the mixture is pressed so as to obtain a pellet. A laser beam is radiated to the pellet. The laser beam evaporates the carbon and the nickel-cobalt alloy, and the carbon vapor is condensed in the presence of the metal catalyst. Single-wall carbon nanotubes are found in the condensation. A problem is encountered in the prior art process in that the single-wall carbon nanotubes are not constant in diameter.

SUMMARY OF THE INVENTION

It is therefore an important object of the present invention to provide a process for producing single-wall carbon nanotubes, which is uniform in diameter.

The present inventors contemplated the problem inherent in the prior art process, and noticed that the ratio between the carbon vapor and the metal catalyst vapor was varied with time due to absorption of the laser light. The graphite powder was black, and took up the laser light rather than the metal catalyst. The laser light thus absorbed raised the temperature rapidly rather than the metal catalyst, and the metal catalyst was left in the surface portion. The metal catalyst layer reflected the laser light, and the graphite powder was less sublimated. This resulted in that the purity of carbon was not uniform. For this reason, the carbon nanotubes did not become constant in diameter.

To accomplish the object, the present invention proposes to independently evaporate carbon and metal catalyst.

In accordance with one aspect of the present invention, there is provided a process for producing carbon nanotubes comprising the steps of preparing a source of carbon vapor and a source of catalyst vapor physically separated from each other, radiating laser beams to the source of carbon vapor and the source of catalyst vapor so as to generate a carbon vapor/cluster and a catalyst vapor/cluster, and allowing the carbon vapor/cluster to be mixed with the catalyst vapor/cluster so as to form the carbon vapor/cluster into carbon nanotubes.

In accordance with another aspect of the present invention, there is provided a laser ablation system for producing carbon nanotubes comprising a reactor having an air-tight chamber where a source of carbon vapor and a source of catalyst vapor are separately provided, a laser beam generator provided for the reactor and radiating laser beams to the source of carbon vapor and the source of catalyst vapor for producing a carbon vapor/cluster and a catalyst vapor/cluster from the source of carbon vapor and the source of catalyst vapor, respectively, an evacuating sub-system connected to the reactor for evacuating a gaseous mixture from the air-tight chamber, a carrier gas supply sub-system connected to the reactor supplying carrier gas to the air-tight chamber for forming a carrier gas flow in the air-tight chamber, and a collector provided in the carrier gas flow and capturing carbon nanotubes formed from the carbon vapor/cluster in the presence of the catalyst vapor/cluster and carried on the carrier gas flow.

BRIEF DESCRIPTION OF THE DRAWINGS

The features and advantages of the process and the laser ablation apparatus will be more clearly understood from the following description taken in conjunction with the accompanying drawings in which.

DESCRIPTION OF THE PREFERRED EMBODIMENT

Figure 1A:
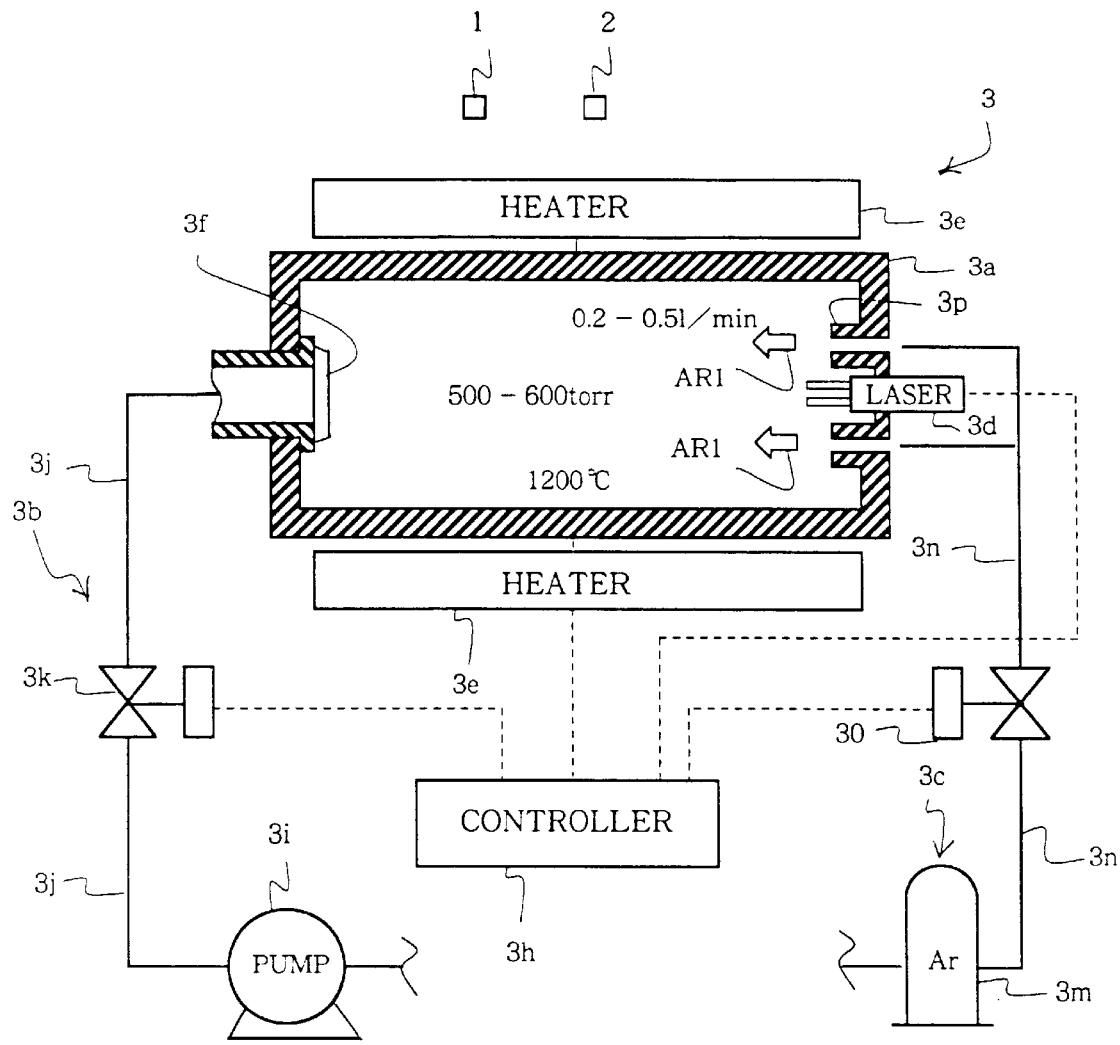
FIGS. 1A to 1C are schematic views showing a process for producing carbon nanotubes according to the present invention.
Figure 1B:
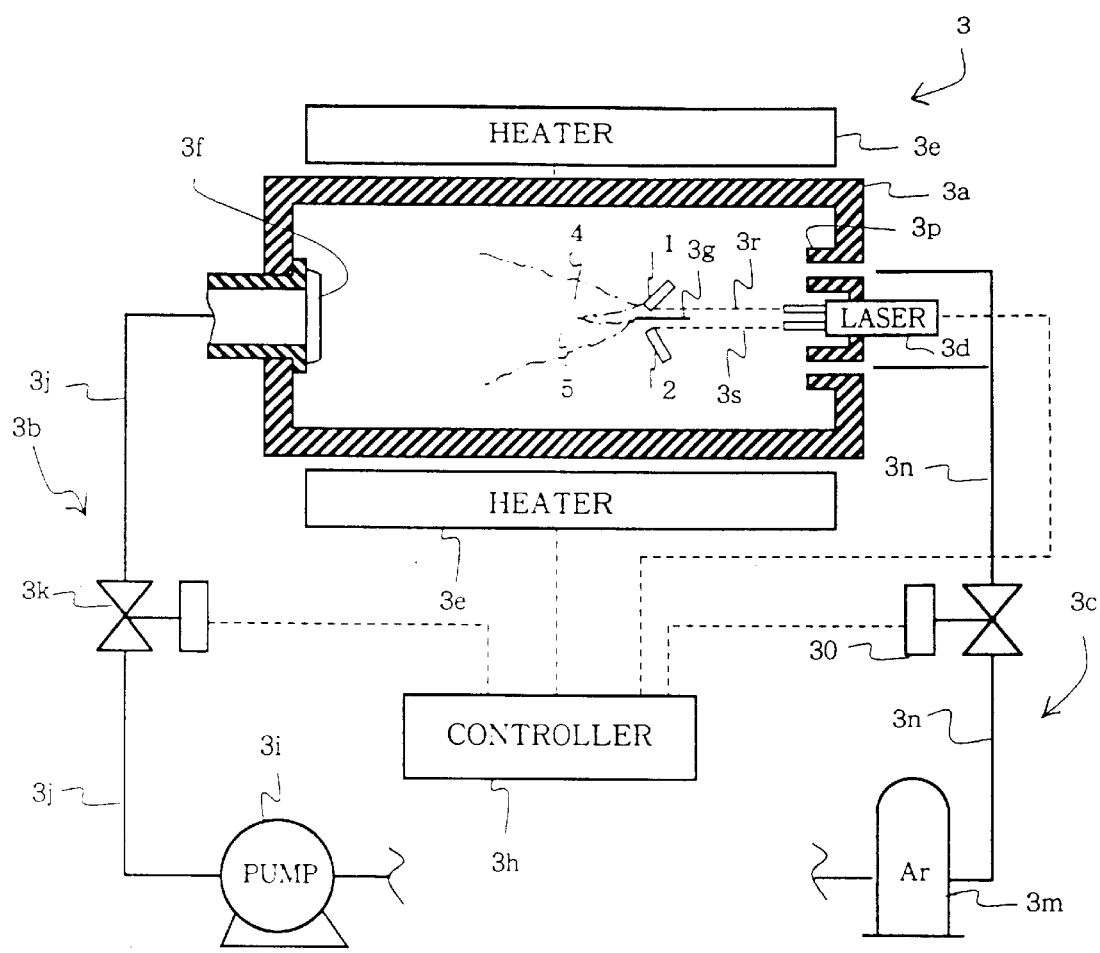
Figure 1C:
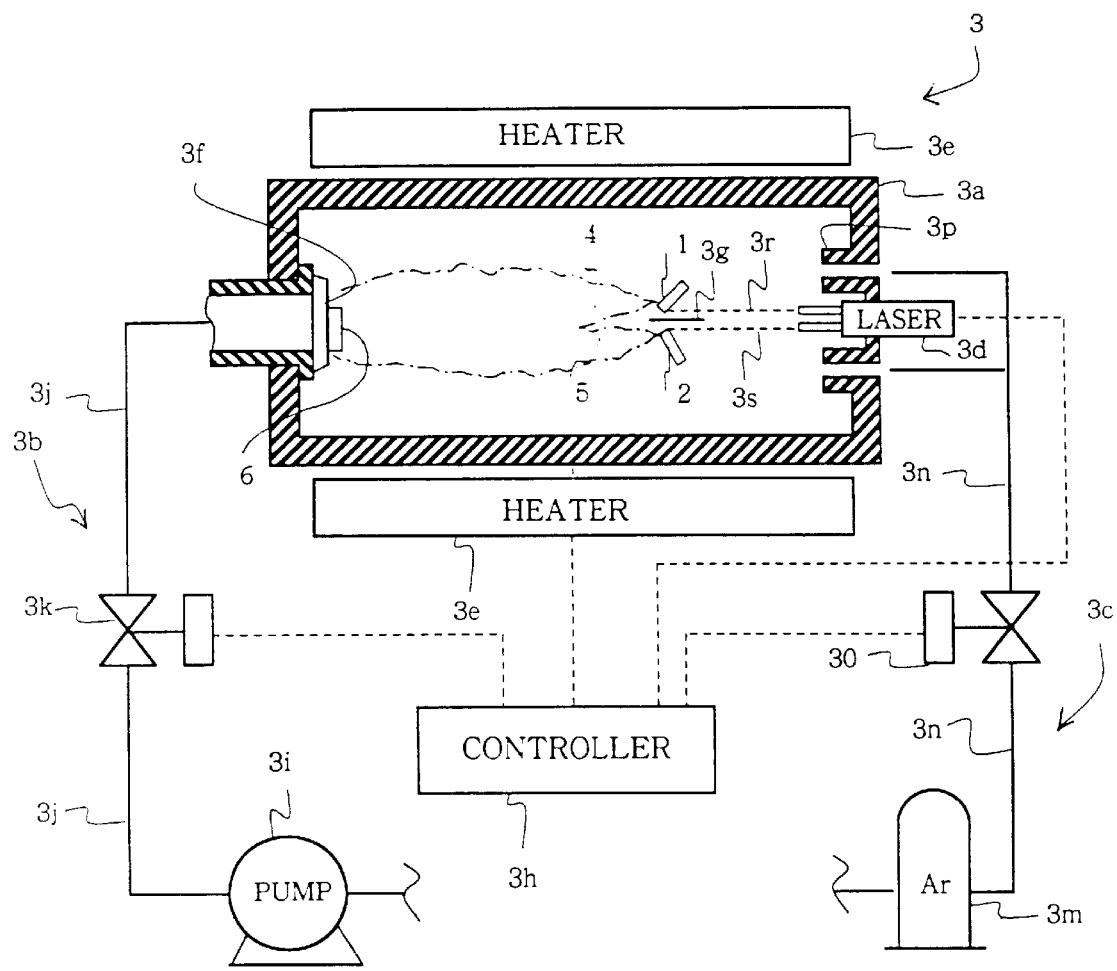

FIGS. 1A to 1C illustrate a process for producing carbon nanotubes embodying the present invention. The process starts with preparation of a carbon pellet 1, a metal catalyst pellet 2 and a laser ablation system 3. The carbon pellet 1, the metal catalyst pellet 2 and the laser ablation system 3 are detailed hereinbelow with reference to FIG. 1A.

The carbon pellet is formed from graphite. The graphite consists of carbon, and is shaped into the carbon pellet by using a standard pelleting machine. The carbon pellet 1 has a plate-like configuration, and is 10 millimeters long and 3 to 5 millimeters wide.

The metal catalyst pellet 2 is formed of nickel-cobalt alloy. The nickel and the cobalt are regulated to the atomic ratio of 1:1. Nickel, cobalt, platinum, palladium and alloys thereof are available for the metal catalyst. The alloy contains at least two elements selected from nickel, cobalt, platinum and palladium. The metal catalyst is also shaped into a plate-like configuration by using the pelleting machine, and is equal in dimensions to the carbon pellet 1.

The laser ablation system 3 includes a reactor 3a, an evacuating sub-system 3b, an inert gas supply sub-system 3c, a laser beam generator 3d, a heater 3e, a collector 3f, a spacer 3g (see FIGS. 1B and 1C) and a controller 3h. The evacuating sub-system 3b and the inert gas supply sub-system 3c create vacuum in the reactor, and cause inert gas to flow through the reactor 1 as indicated by arrows AR1. The heater 3e maintains the inside of the reactor 3a at a predetermined temperature range. The carbon pellet 1 and the metal catalyst pellet 2 are separately provided inside the reactor, and the spacer 3g of quartz plate is provided between the carbon pellet 1 and the metal catalyst pellet 2. The spacer 3g is 0.3 millimeter thick. The laser beam generator 3d radiates laser beams 3r/3s to the carbon pellet 1 and the metal catalyst pellet 2, respectively. Carbon vapor and catalyst vapor are generated from the carbon pellet 1 and the metal catalyst pellet 2, respectively, and condensate is captured by the collector 3f. The process sequence is controlled by the controller 3h.

The reactor 3a is formed of quartz or ceramic, and has a cylindrical configuration. Any material is available for the reactor 3a in so far as it is hardly eroded in the ambience created in the reactor 3a. Although the reactor 3a is not limited to the cylindrical configuration, the cylindrical configuration is desirable.

The evacuating sub-system 3b includes a rotary vacuum pump 3i, a pipe 3j connected between the reactor 3a and the rotary vacuum pump 3i and an electromagnetic flow control valve 3k inserted into the pipe 3j. On the other hand, the inert gas supply sub-system 3c includes a reservoir tank 3m for inert gas such as, for example, argon gas, a pipe connected between the reservoir tank 3m and the reactor 3a and an electromagnetic flow control valve 3o inserted into the pipe 3n. The electromagnetic flow control valve 3o supplies the argon gas to the inlet nozzle 3p at 0.2 to 0.5 litter per minute, and the argon gas is blown off into the reactor 3a. The rotary vacuum pump 3i evacuates the argon gas, and the electromagnetic flow control valve 3k evacuates the argon gas, and the electromagnetic flow control value 3k maintains the argon gas in the reactor 3a at 500 torr to 600 torr.

The laser beam generator 3d generates laser light, and radiates laser beams 3r/3s to the carbon pellet 1 and the metal catalyst pellet 2, respectively. The laser beam generator 3d includes a laser light emitting element formed of Nd contained single crystalline YAG (Yttrium Aluminum Garnet), and the laser light emitting element radiates laser light pulses 3r/3s. The laser light has 532 nanometer wavelength, and oscillates at 10 Hz. The pulse width ranges from 7 nanoseconds to 10 nanoseconds, and the power is regulated to 1.2 to 9.2 J/pulse. The laser beam 3r/3s has cross section of 0.2 $cm^2$.

The heater 3e heats the reactor 3a, and the controller 3h maintains the inside of the reactor 3a around 1200 degrees in centigrade. The heater 3e may be implemented by an oven.

Figure 2:
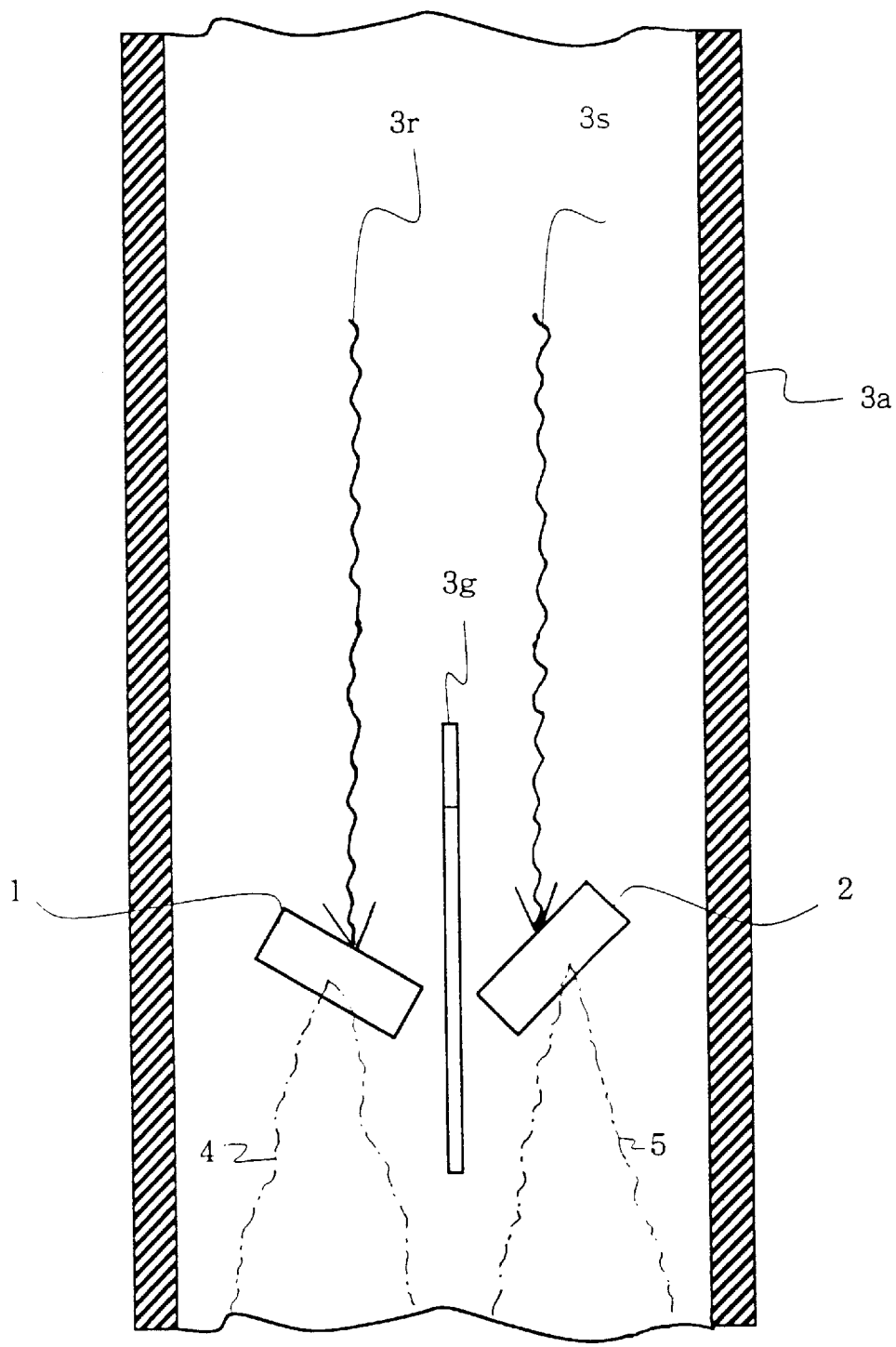
FIG. 2 is a schematic view showing a carbon pellet and metal catalyst pellet independently radiated with laser beams.

When the carbon pellet 1, the metal catalyst pellet 2 and the laser ablation system 3 are prepared, an operator inserts the carbon pellet 1 and the metal catalyst pellet 2 into the reactor 3a. The carbon pellet 1 and the metal catalyst pellet 2 symmetrically decline with respect to the center line of the reactor 3a, and the major surface of the carbon pellet 1 is opposed through the spacer 3g to the concave surface of the metal catalyst pellet 2 as shown in FIG. 2.

The reactor 3a is closed, and the rotary vacuum pump 3i evacuates the air from the reactor 3a. When the vacuum is developed in the reactor 3a, the inert gas supply system 3c supplies the argon gas at 0.5 litter/minute. The evacuating sub-system 3b cooperates with the inert gas supply system 3c, and maintain the inside of the reactor 3a at 600 mmHg. The argon gas flows from the nozzle 3p toward the collector 3f.

Subsequently, the laser beam generator 3d radiates the laser beams 3r/3s to the carbon pellet 1 and the metal catalyst pellet 2. In this instance, the pulse width and the power are adjusted to 10 nanosecond and 50 mJ/pulse·$cm^2$. The laser beams 3r/3s directly heat the carbon pellet 1 and the metal catalyst pellet 2, and carbon vapor/cluster 4 and nickel-cobalt vapor/cluster 5 are constantly generated from the carbon pellet 1 and the metal catalyst pellet 2, respectively, as shown in FIG. 1B.

The argon gas carries the carbon vapor/cluster 4 and the nickel-cobalt vapor/cluster 5 toward the collector 3f. The carbon vapor/cluster 4 are mixed with the nickel-cobalt vapor/cluster 5, and forms into single-wall carbon nanotubes 6. The single-wall carbon nanotubes 6 are carried toward the collector 3f, and are captured by the collector 3f as shown in FIG. 1C. The carbon vapor/cluster 4 and the nickel-cobalt vapor/cluster 5 are constant in mass, and keeps the content of carbon in the condensate or the single-wall carbon nanotubes 6 constant. This results in the constant diameter of the single-wall carbon nanotubes 6.

As will be appreciated from the foregoing description, the carbon pellet 1 and the metal catalyst pellet 2 are used in the process according to the present invention, and make the single-wall carbon nanotubes constant in diameter.

Although particular embodiments of the present invention have been shown and described, it will be apparent to those skilled in the art that various changes and modifications may be made without departing from the spirit and scope of the present invention.

It is required for the process according to the present invention to separately vaporize the carbon and the metal catalyst. However, this requirement does not means the carbon and the metal catalyst respectively formed into pellets. The carbon and the metal catalyst may be in the form of powder.

The carbon pellet and the metal catalyst pellet may have a semi-column configuration.

What is claimed is:

1. A laser ablation system for producing carbon nanotubes, comprising:

a reactor having an air-tight chamber where a source of carbon vapor and a source of catalyst vapor are separately provided;

a laser beam generator provided for said reactor and radiating laser beams to said source of carbon vapor and said source of catalyst vapor for producing a carbon vapor/cluster and a catalyst vapor/cluster from said source of carbon vapor and said source of catalyst vapor, respectively;

an evacuating sub-system connected to said reactor for evacuating a gaseous mixture from said air-tight chamber;

a carrier gas supply sub-system connected to said reactor supplying carrier gas to said air-tight chamber for forming a carrier gas flow in said air-tight chamber; and a collector provided in said carrier gas flow and capturing carbon nanotubes formed from said carbon vapor/cluster in the presence of said catalyst vapor/cluster and carried on said carrier gas flow.

2. The laser ablation system as set forth in claim 1, in which said carrier gas supply system includes a source of inert gas, and said evacuating sub-system and said carrier gas supply system cooperate with each other so as to flow an inert gas at 0.2 to 0.5 liter per minute at 500 to 600 torr in said air-tight chamber.

3. The laser ablation system as set forth in claim 1, in which said reactor is formed of a material selected from the group consisting of quartz and ceramics.

4. The laser ablation system as set forth in claim 1, in which said laser beam generator produces laser pulse trains from a YAG laser for said laser beams, and the laser pulse trains have a wavelength of 532 nanometers, a frequency of 10 Hz, a pulse width of 7 to 10 nanoseconds and a power of 1.2 to 9.1 J/pulse.

5. The laser ablation system as set forth in claim 4, further comprising a heater for heating said air-tight chamber to at least 1200 degrees in centigrade.

6. The laser ablation system as set forth in claim 1, in which a carbon pellet and a catalyst pellet serve as said source of carbon vapor and said source of catalyst vapor, respectively.

7. The laser ablation system as set forth in claim 6, in which said catalyst pellet is formed of a material selected from the group consisting of nickel, cobalt, platinum, palladium and alloys containing at least two metals of said nickel, said cobalt, said platinum and said palladium.

* * * * *